UNITED STATES PATENT OFFICE.

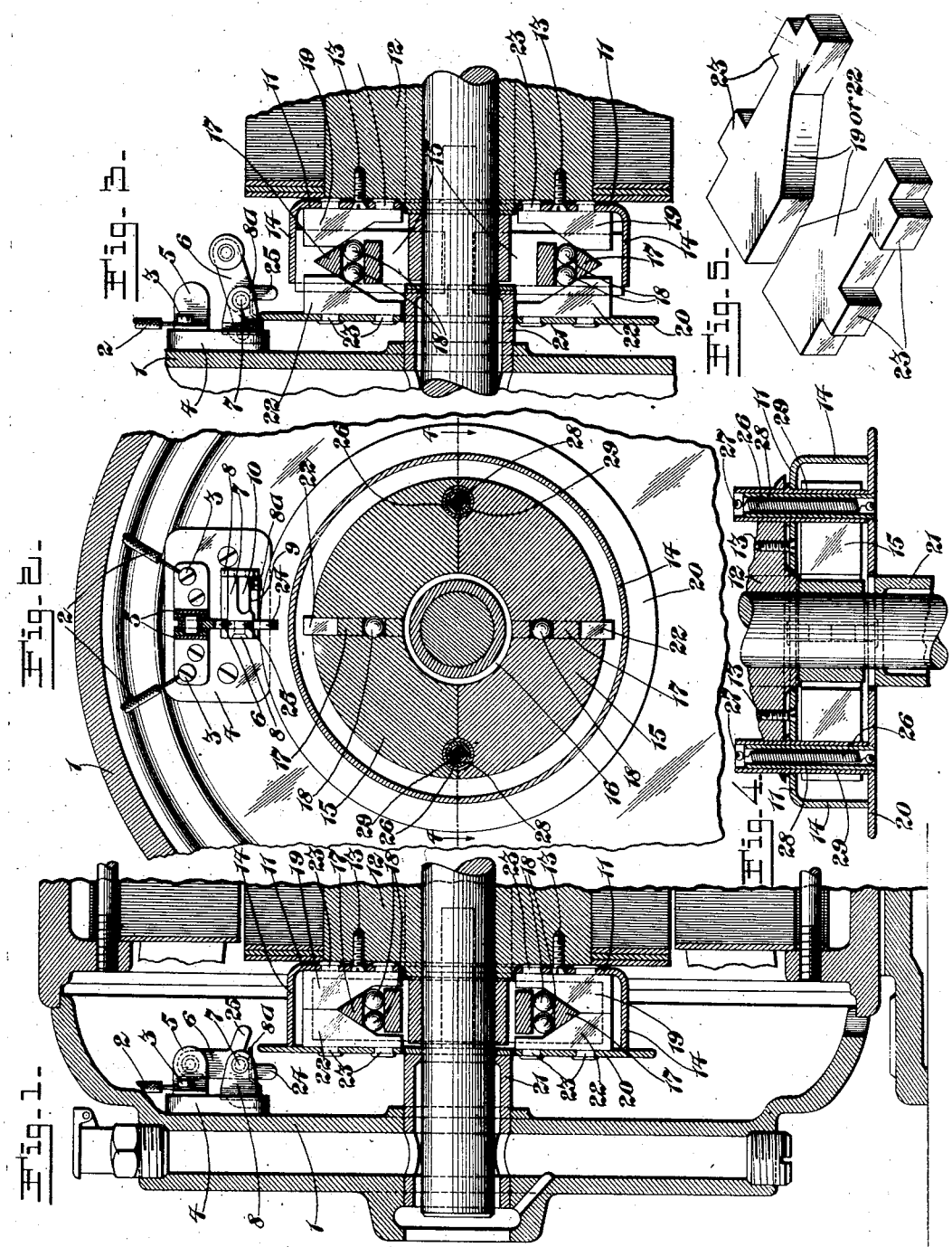

WILLIAM G. WINTER, OF ST. LOUIS, MISSOURI.

ELECTRIC MOTOR SWITCH.

1,406,432.     Specification of Letters Patent.     Patented Feb. 14, 1922.

Application filed December 7, 1920. Serial No. 428,896.

*To all whom it may concern:*

Be it known that I, WILLIAM G. WINTER, a citizen of the United States, residing at the city of St. Louis and State of Missouri, have invented a new and useful Electric Motor Switch, of which the following is a specification.

This invention relates to electric motor switches, and more particularly to switches operated by mechanism controlled by centrifugal force.

An object of the invention is to provide mechanism for operating a self-contained electric switch to open and to closed positions, said mechanism being actuated by centrifugal force to open the switch automatically as an incident to the running of the motor at a predetermined speed, whereby the power passing through said switch will be turned off as an incident to the running of the motor at a predetermined speed. When the motor stops, and when the speed of the motor is diminished below a predetermined speed the switch actuating mechanism operates the switch to closed position, so that when the power from the main coils is turned off, the switch and the operating mechanism therefor (which constitute the subject-matter of the present invention) operate to close the switch, thus placing the motor and switch in condition for further operation when desired.

Another object of the present invention is to provide a switch mechanism for controlling the power from the starting coils so that when the electric motor attains a predetermined speed the switch controlling the power to the starting coils will be opened, leaving the motor in operation by power passing through the main coils only. The mechanism for operating the switch is operated axially of the armature shaft, as distinguished from radial movement relative to the armature shaft, in order to open and to close the switch. Axial movement of the switch operating device in one direction is effected by centrifugal force alone so that the switch will be opened as an incident to the attainment of a predetermined speed by the motor; and axial movement of the switch operating device in the opposite direction to close the switch is effected by special actuators provided for that purpose.

Another object of the invention is to provide switch operating mechanism for an electric motor arranged to move axially relative to the armature shaft under the impulse of centrifugal force, in order to open the switch.

An additional object of the invention is to provide an electric switch of the character mentioned of strong and durable construction which will withstand the wear and other forces to which it is subjected, and which operates quickly under control of the operating forces.

Various other objects of the invention will appear from the following description in which reference is made to the accompanying drawings illustrating one embodiment of the invention, and in which—

Fig. 1 is a sectional view of the invention in connection with an electric motor, this section being on a line parallel with the armature shaft and the switch being closed.

Fig. 2 is a sectional view taken transversely of the armature shaft.

Fig. 3 is a sectional view similar to Fig. 1 showing the switch operating mechanism in the position it occupies when the motor is running at a predetermined speed and when the switch is open.

Fig. 4 is a sectional view on the line 4—4 of Fig. 3.

Fig. 5 is a perspective view of a pair of wedge blocks included in the invention.

As before mentioned my invention is specially designed for use in connection with an electric motor, and the invention is so shown in the accompanying drawings. As shown, the electric switch and the operating mechanism therefor are enclosed by one of the end plates 1 of the motor. The wires 2 from the starting coils are secured to binding posts 3 mounted on a block 4 of insulation material. Power to the starting coils to supplement the power passing to the main coils is admitted to the motor through the switch to which the binding posts 3 are connected. This power to the starting coils is admitted to the motor to supplement the power to the main coils when the motor is starting, and is continued until the motor attains a predetermined speed at which the motor may be operated by the power to the main coils alone and without power to the starting coils. The switch shown comprises two resilient contact arms 5 both of which are in independent connection with the binding posts 3; and a switch member 6 supported by a rocking support 7 carried by a bracket 8 secured to the insulation block 4. The switch member 6 is movable to position between the contact arms 5 where contact is made with both of said contact arms, and is also movable out of contact with said contact arms, as shown in Fig. 3. Construction is provided for holding the switch member 6 in its different adjusted positions. As shown, said construction comprises a spring plate 8ª arranged to press against a flat surface 9 on the support 7 to hold the switch closed; and to press against a flat surface 10 on the support 7 to hold the switch open. The spring 8ª also serves to complete the final movements of the switch member 6 to closed position and to open position, the power of the spring being exerted to effect such final movements of the switch member in a manner that will be readily comprehended by reference to Figs. 1 and 3.

As before mentioned the switch member is moved to position to open the switch by mechanism operating under control of centrifugal force resulting from the attainment of a predetermined speed of operation by the motor. The mechanism for operating the switch member is supported for axial movement only, as distinguished from radial movement relative to the armature shaft of the motor. This enables me to provide a better mechanism which is of stronger construction than the operating devices which have radial movements and which is also more positive and reliable in its operation. An actuator for operating the mechanism which operates the switch member is provided. Said actuator moves in a radial direction relative to the armature shaft under the impulse of centrifugal force resulting from the operation of the motor, and such radial movement of the actuator causes axial movement of the switch operating device or mechanism.

As shown a disc 11 is secured to the armature core 12 by appropriate binding elements, such as screws 13 passing through the disc and into threaded holes in the core. Said disc is formed with a circumferential flange 14 which encloses the radially movable parts that operate the switch actuator axially in one direction to open the switch and which serves as a stop or abutment to limit movement of said radially movable parts. As shown, each of the radially movable parts mentioned is in the form of a semi-circular weight 15, the same being formed with appropriate recesses 16 to receive the armature shaft and to permit the edges of said weights to contact with each other when the motor is not running and when said weights are in their idle positions. Obviously, said weights will be impelled radially when the motor is running and this radial movement of the weights is utilized to effect axial movement of the device which opens the switch. Each weight is recessed to form a wedge shaped portion 17 and to provide a space for supporting a pair of balls 18 which reduce friction and prevent adhesion of the parts to each other. The disc 11 supports a pair of wedge members 19 which extend into the recesses in the weights 15 respectively, and against the inclined surface of which the wedge portions 17 of the weights and as well as the balls 18 operate when the weights are actuated radially.

An axially movable switch operating device is provided, the same being in the form of a disc or plate 20 having a central opening to receive the bearing 21 of the armature shaft. The disc or plate 20 supports a pair of wedge blocks 22 similar to the wedge blocks 19 and extending into the recesses in the weights 15. When the motor is not running and the parts are in their normal positions the outer portions of the adjacent wedge blocks 19 and 22 contact with each other; but, when the motor is running at speed, the weights 15 are moved radially by centrifugal force, causing the wedge portions 17 and the balls 18 to operate against the inclined surfaces of the wedge blocks 22 and thereby move the disc or plate 20 axially in a direction to open the switch controlling the circuit to the starting coils, as shown in Fig. 3. The form of the wedge blocks 19 and 22 is clearly shown in Fig. 5 in which it will be seen that said wedge blocks are formed with projections 23 which may be inserted in holes in the discs 11 or 20, as desired, and then hammered or pressed to form heads or enlargements whereby the wedge blocks will be securely held in connection with the parts to which they are secured.

The switch member 6 is provided with an extended arm or finger 24 which, when the switch is closed, extends into the path of axial movement of the disc 20, so that as said disc 20 moves axially it will press against the arm or finger 24 and thus turn the switch member 6 from closed position (shown in Fig. 1) to open position (shown in Fig. 3). As previously mentioned, the final movement of the switch member 6 to the position shown in Fig. 3 is completed by the spring 8, so that said switch member will not return to closed position unless positively actuated.

When the motor is stopped the switch member is automatically moved from open position, as shown in Fig. 3, to closed position, as shown in Fig. 1, and this movement of the switch member 6 is also effected by the disc 20. To enable the disc 20 to move the switch 6 from open position to closed position automatically and as an incident to stopping of the motor, said disc is moved axially to its initial position and during such movement engages the arm or finger 25 on the switch member 6, thus imparting the initial movement of said switching member toward closed position and permitting the spring 8ª to complete the final movement of said switch member toward its closed position.

For moving the parts from the position shown in Fig. 3 to the position shown in Fig. 1, automatically and as an incident to stopping of the motor, special actuators are provided. As shown, said actuators are in the form of retractile springs 26 having their inner ends connected to stationary parts 27 and their outer ends connected to the disc 20. For holding the disc 20 in proper position relative to the other parts and for guiding said disc 20 in its axial movement, I have provided tubes 28 extending inwardly from the disc 20 parallel with the armature shaft and operating within tubular guides 29 carried by the armature core and extending in appropriately formed notches or recesses at the contacting edges of the weights 15. This construction leaves the weights 15 free for radial movement and for the slight axial movement required, and at the same time guides the disc 20 properly so that said disc is free from torsional strains, and in no way interferes with the freedom and ease of operation of the switch operating mechanism.

From the foregoing it is apparent that my invention serves all of its intended purposes and functions in a highly efficient and satisfactory manner. The parts are of simple and strong construction and are free from manufacturing difficulty. The device is easily assembled in connection with a motor and when once assembled it is practically impossible for any of the parts to work out of position or to become dislocated.

Obviously, the construction and arrangement of the parts may be widely varied without departure from the principle and nature of the invention. I do not restrict myself to the precise form and arrangement shown, nor to unessential features and details of construction, but what I claim and desire to secure by Letters Patent, is:—

1. In an electric motor switch, the combination of a stationary support, a switch carried by the stationary support and movable to open and closed positions to turn power off and on, an actuator for the switch movable axially relative to the armature of the motor to operate said switch to open and closed positions, a number of radially movable parts supported by the actuator for radial movement under the impulse of centrifugal force, members supported by the armature for imparting axial movement to said radially movable parts, and elements engaged by said radially movable parts for moving said actuator in a direction to open the switch.

2. In an electric motor switch, the combination of a stationary support, a switch carried by the stationary support and movable to open and closed positions to turn power off and on, an actuator for the switch movable axially relative to the armature of the motor to operate said switch to open and to closed positions, a number of radially movable parts supported by the actuator for radial movement under the impulse of centrifugal force, members supported by the armature for imparting axial movement to said radially movable parts, elements engaged by said radially movable parts for moving said actuator in a direction to open the switch, and devices for moving said actuator axially in the opposite direction to close the switch as an incident to the stopping of the motor.

3. In an electric motor switch, the combination of a switch controlling the admission of power to the starting coils of the motor, radially movable elements supported in connection with the armature of the motor arranged to be moved radially under the influence of centrifugal force resulting from rotation of the armature, an actuator for the switch movable axially toward and away from the armature, means whereby said actuator will be moved axially away from the armature to open the switch by the radial movement of said elements as an incident to the running of the motor at a predetermined speed, and supports guiding said actuator in its axial movements.

4. In an electric motor switch, the combination of a switch controlling the admission of power to the starting coils of the motor, radially movable elements supported in connection with the armature of the motor arranged to be moved radially under the influence of centrifugal force resulting from rotation of the armature, an actuator for the switch movable axially toward and away from the armature, means whereby said actuator will be moved axially away from the armature to open the switch by radial movement of said elements as an incident to the running of the motor at a predetermined speed, supports guiding said actuator in its axial movements, and special actuators operating to move said first-named actuator axially toward the armature to close said switch as an incident to stopping of the motor.

5. In an electric motor switch, the combination of a pivoted switch movable to open and to closed positions to turn the power to the starting coils of the motor off and on, a device for preventing accidental movement of the switch from one position to another, an actuator for the switch movable axially relative to the armature of the motor to operate said switch to open and to closed positions, a support for said actuator, means supported by the armature and arranged to move radially under the impulse of centrifugal force for moving said actuator axially, and elements whereby radial movement of said means to move said actuator axially in one direction will cause said actuator to move the switch to open position.

6. In an electric motor switch, the combination of a pivoted switch movable to open and to closed positions to turn the power to the starting coils of the motor off and on, a device for preventing accidental movement of the switch from one position to another, an actuator for the switch movable axially relative to the armature of the motor to operate said switch to open and to closed positions, a support for said actuator, means supported by the motor and arranged to move radially under the impulse of centrifugal force for moving said actuator axially, elements whereby radial movement of said means to move said actuator axially in one direction will cause said actuator to move the switch to open position, and devices for moving said actuator axially in the opposite direction to close the switch as an incident to stopping of the motor.

7. In an electric motor switch, the combination of a switch controlling the admission of power to the starting coils of the motor, radially movable elements, means for supporting said elements in an arrangement whereby they will be moved radially under the influence of centrifugal force resulting from the rotation of the armature, an actuator for the switch movable axially toward and away from the armature, and means whereby said actuator will be moved axially away from the armature to open the switch by the radial movement of said elements as an incident to the running of the motor at a predetermined speed.

8. In an electric motor switch, the combination of a switch controlling the admission of power to the starting coils of the motor, radially movable elements, means for supporting said elements in an arrangement whereby they will be moved radially under the influence of centrifugal force resulting from the rotation of the armature, an actuator for the switch movable axially toward and away from the armature, means whereby said actuator will be moved axially away from the armature to open the switch by the radial movement of said elements as an incident to the running of the motor at a predetermined speed, and a device cooperating with the switch to prevent accidental movement thereof from one position to another.

9. In an electric motor switch, the combination of a switch controlling the admission of power to the starting coils of the motor, radially movable elements, means for supporting said elements in an arrangement whereby they will be moved radially under the influence of centrifugal force resulting from the rotation of the armature, an actuator for the switch movable axially toward and away from the armature, means whereby said actuator will be moved axially away from the armature to open the switch by the radial movement of said elements as an incident to the running of the motor at a predetermined speed, and means guiding the actuator in its axial movements and preventing displacement of the actuator.

10. In an electric motor switch, the combination of a support, a switch pivoted on the support controlling the admission of power to the starting coils of the motor, an actuator for the switch movable axially toward and away from the switch during movement away to open the switch during movement away from the armature and to close the switch during movement toward the armature, radially movable elements in connection with the armature arranged to be moved radially under the influence of centrifugal force resulting from rotation of the armature to cause said actuator to open the switch, a device for preventing accidental operation of the switch, and guides for said actuator holding the same in proper relation to the armature.

11. In an electric motor switch, the combination of a support, a switch pivoted on the support controlling the admission of power to the starting coils of the motor, an actuator for the switch movable axially toward and away from the armature and arranged to open the switch during movement away from the armature and to close the switch during the movement toward the armature, radially movable elements in connection with the armature arranged to be moved radially under the influence of centrifugal force resulting from rotation of the armature to cause said actuator to open the switch, a device for preventing accidental operation of the switch, guides for said actuator holding the same in proper relation to the armature, and springs operating to move said actuator axially toward the armature to close the switch as an incident to stopping of the motor.

12. In an electric motor switch, the combination of a switch controlling the admission of power to the starting coils of the motor, an actuator for the switch movable axially toward and away from the armature, connections for holding the actuator in connection with the armature and guiding the actuator in its movements toward and away from the armature, centrifugal elements arranged to be operated centrifugally under the influence of force resulting from the rotation of the armature arranged to move said actuator in one direction, and springs for moving the actuator in the opposite direction.

13. In an electric motor switch, the combination of an electric switch controlling the admission of power to the starting coils of the motor, of a disc, connections supporting the disc in connection with the armature and guiding the disc in movements toward and away from the armature, radially movable elements operating to move the disc axially away from the armature as an incident to the running of the motor at a predetermined speed, springs for moving the disc axially in one direction as an incident to stopping of the motor, and means whereby the disc will operate said switch when said disc is moved axially as aforesaid.

14. In an electric motor switch, the combination of a pivoted switch controlling the admission of power to the starting coils of the motor, arms on said switch, a disc, guides supporting the disc for axial movements relative to the motor and for rotation with the motor, centrifugal members for moving said disc in one direction into engagement with one of said arms on the switch to open the switch, and springs for moving said disc in the opposite direction to engage another of said arms to close the switch.

15. In an electric motor switch, the combination of a pivoted switch controlling the admission of power to the starting coils of the motor, arms on said switch, a disc, guides supporting the disc for axial movements relative to the motor and for rotation with the motor, centrifugal members for moving said disc in one direction into engagement with one of said arms on the switch to open the switch, springs for moving said disc in the opposite direction to engage another of said arms to close the switch, and a device cooperating with said switch to prevent accidental operation thereof.

WILLIAM G. WINTER.